US009819858B2

(12) United States Patent
Ji

(10) Patent No.: US 9,819,858 B2
(45) Date of Patent: Nov. 14, 2017

(54) VIDEO ACQUISITION METHOD AND DEVICE

(71) Applicant: TENCENT TECHNOLOGY (SHENZHEN) COMPANY LIMITED, Shenzhen (CN)

(72) Inventor: Xiaocui Ji, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 315 days.

(21) Appl. No.: 14/671,060

(22) Filed: Mar. 27, 2015

(65) Prior Publication Data

US 2015/0201125 A1   Jul. 16, 2015

Related U.S. Application Data

(63) Continuation of application No. PCT/CN2013/084154, filed on Sep. 25, 2013.

(30) Foreign Application Priority Data

Sep. 29, 2012   (CN) .......................... 2012 1 0370674

(51) Int. Cl.
*H04N 5/232*   (2006.01)
*H04N 19/85*   (2014.01)
(Continued)

(52) U.S. Cl.
CPC .......... *H04N 5/23222* (2013.01); *G06F 9/54* (2013.01); *G06T 1/0007* (2013.01); *H04L 9/18* (2013.01);
(Continued)

(58) Field of Classification Search
CPC .......................... G06F 9/45512; G06F 9/541
(Continued)

(56) References Cited

U.S. PATENT DOCUMENTS 5,940,610 A   8/1999   Baker et al.
6,489,973 B1   12/2002   Heiden
(Continued)

FOREIGN PATENT DOCUMENTS

| CN | 1403932 A | 3/2003 |
|---|---|---|
| CN | 102377985 A | 3/2012 |
| CN | 102547239 A | 7/2012 |
| JP | 2003296138 A | 10/2003 |
| JP | 2007317101 A | 12/2007 |

OTHER PUBLICATIONS

International Search Report for Application No. PCT/CN2013/084154 dated Nov. 28, 2013.
(Continued)

*Primary Examiner* — Andy Ho
(74) *Attorney, Agent, or Firm* — Harness, Dickey & Pierce, P.L.C.

(57) ABSTRACT

A video acquisition method and device. The method includes setting a video acquisition class in a programming language framework layer. With the video acquisition class inherits a class in a video acquisition underlying library and registers a callback function for the video acquisition underlying library. The video acquisition class sends a video acquisition command to the video acquisition underlying library and the video acquisition underlying library acquires video data according to the video acquisition command. The callback function is applied to acquire the video data from the video acquisition underlying library and the video data is sent to a coder for video data coding.

16 Claims, 4 Drawing Sheets

(51) Int. Cl.
  *G06T 1/00* (2006.01)
  *H04L 29/06* (2006.01)
  *H04N 21/2743* (2011.01)
  *G06F 9/54* (2006.01)
  *H04L 9/18* (2006.01)
  *H04N 21/4223* (2011.01)
  *H04N 21/414* (2011.01)
  *H04N 21/443* (2011.01)

(52) U.S. Cl.
  CPC .......... *H04L 65/1046* (2013.01); *H04L 65/60* (2013.01); *H04N 5/23206* (2013.01); *H04N 19/85* (2014.11); *H04N 21/2743* (2013.01); *H04L 2209/34* (2013.01); *H04N 21/41407* (2013.01); *H04N 21/4223* (2013.01); *H04N 21/4431* (2013.01)

(58) Field of Classification Search
  USPC .................................................. 719/320, 328
  See application file for complete search history.

(56) References Cited

U.S. PATENT DOCUMENTS

| | | | | |
|---|---|---|---|---|
| 7,979,264 | B2* | 7/2011 | Khan | .................... G06F 9/4411 |
| | | | | 703/13 |
| 9,280,368 | B2* | 3/2016 | Kim | .................... G06F 9/44526 |
| 2002/0165869 | A1 | 11/2002 | Duruoz | |
| 2008/0151058 | A1* | 6/2008 | Xu | .......................... G06F 3/005 |
| | | | | 348/207.1 |
| 2012/0143983 | A1* | 6/2012 | Kipnis | ...................... G06F 3/14 |
| | | | | 709/217 |
| 2012/0254759 | A1* | 10/2012 | Greenberg | .......... G06F 17/3089 |
| | | | | 715/719 |

OTHER PUBLICATIONS

European Search Report for Application No. 13841730.8 dated Sep. 18, 2015.
International Preliminary Report for Application No. PCT/CN2013/084154 dated Apr. 16, 2015.

* cited by examiner

VIDEO ACQUISITION METHOD AND DEVICE

CROSS-REFERENCE TO RELATED APPLICATIONS

This application is a continuation of United States Patent Application No. PCT/CN2013/084154 filed Sep. 25, 2013. This application claims the benefit and priority of Chinese Application No. 201210370674.1 filed Sep. 29, 2012. The entire disclosures of each of the above applications are incorporated herein by reference.

FIELD

The present disclosure relates to a method and apparatus for capturing videos.

BACKGROUND

This section provides background information related to the present disclosure which is not necessarily prior art.

Video communications are generally implemented based on video streams. Video streams can provide video in real time while ensuring video continuity. Users typically perform video communications using one's video capture device, such as mobile phones, computers, digital televisions, and the like. However, there is currently no standard interface defined for video capture devices to implement video streaming services.

SUMMARY

This section provides a general summary of the disclosure, and is not a comprehensive disclosure of its full scope or all of its features.

Various embodiments provide a method for capturing videos to simplify the transmission of video data and increase the efficiency of capturing video data.

Various embodiments provide an apparatus for capturing videos to simplify the transmission of video data and increase the efficiency of capturing video data.

The technical mechanism of various embodiments is as follows.

A method for capturing videos may include:

setting a camera activation class in a framework layer of a programming language, the camera activation class inheriting a video capture bottom layer library and registering a callback function for the video capture bottom layer library;

sending, by the camera activation class, a video capture command to the video capture bottom layer library, the video capture bottom layer library starting to capture video data according to the video capture command; and obtaining the video data from the video capture bottom layer library by using the callback function and sending the video data to an encoder to encode the video data.

An apparatus for capturing videos may include a setting module, a video capturing module, and a video encoding module, in which the setting module is configured to set a camera activation class in a framework layer of a programming language, the camera activation class inheriting a video capture bottom layer library and registering a callback function at the video capture bottom layer library;

the video capturing module is configured to make the camera activation class send a video capture command to the video capture bottom layer library which starts to capture video data according to the video capture command; and the video encoding module is configured to obtain the video data from the video capture bottom layer library by using the callback function and send the video data to an encoder to encode the video data.

According to the above technical mechanism, a camera activation class is set in a framework layer of a programming language. The camera activation class inherits a video capture bottom layer library and registers a callback function for the video capture bottom layer library. The camera activation class sends a video capture command to the video capture bottom layer library which captures video data according to the video capture command. The camera activation class obtains the video data from the video capture bottom layer library by using the callback function and sends the video data to an encoder to encode the video data. According to various embodiments, the capturing, encoding, and sending of video data are all implemented in the framework layer of a programming language and do not need processing at the Java layer. Therefore, time needed for copying and delivering the video data can be reduced and the efficiency of capturing videos can be increased. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

Figure 1:
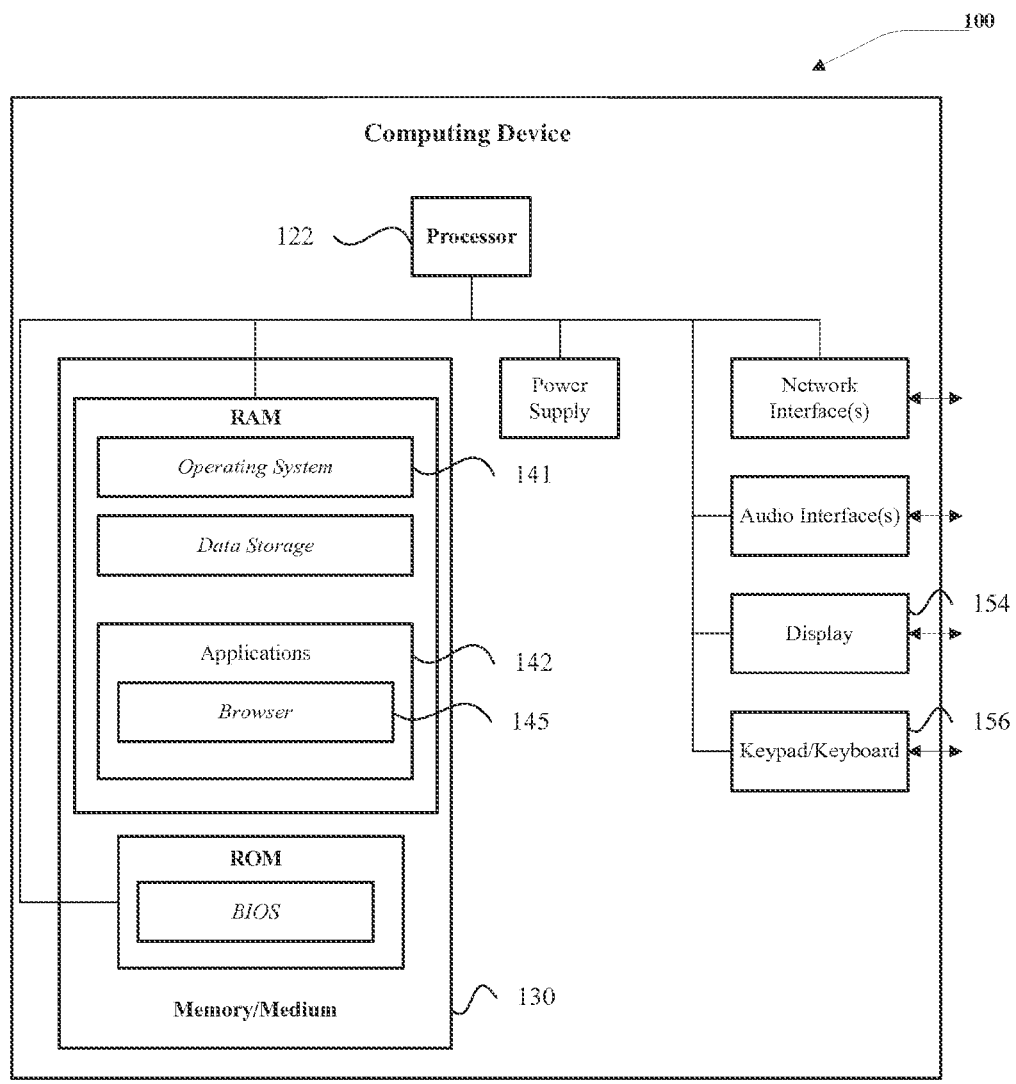
FIG. 1 is a diagram illustrating various embodiments of a computing device.

In various embodiments, a computing device may execute methods and software systems of the present disclosure. FIG. 1 is a diagram illustrating various embodiments of a computing device. As shown in FIG. 1, computing device 100 may execute a method and apparatus of the present disclosure. The computing device 100 may, for example, be a device such as a personal desktop computer or a portable device, such as a laptop computer, a tablet computer, a cellular telephone, or a smart phone. The computing device 100 may also be a server that connects to the above devices locally or via a network.

The computing device 100 may include various capabilities or features. For example, the computing device 100 may include a keypad/keyboard 156. It may also include a display 154, such as a liquid crystal display (LCD), or a display with a high degree of functionality, such as a touch-sensitive color 2D or 3D display. In contrast, however, as another example, a web-enabled computing device 100 may include one or more physical or virtual keyboards, and mass storage medium 130.

The computing device 100 may also include or may execute a variety of operating systems 141, including an operating system, such as a WINDOWS or LINUX, or a mobile operating system, such as iOS, ANDROID, or WINDOWS MOBILE. The computing device 100 may include or may execute a variety of possible applications 142, such as an anti-virus application 145. An application 142 may communicate with other devices over the communication network.

the computing device 100 may include one or multiple non-transitory processor-readable storage medium 130 and one or multiple processors 122 in communication with the non-transitory processor-readable storage media 130. For example, the non-transitory processor-readable storage medium 130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage medium 130 may store a series of instructions, or units and/or modules that comprise the series of instructions, for conducting operations described in the present disclosure. The one or multiple processors may be configured to execute the series of instructions and perform the operations in various embodiments.

Figure 2:
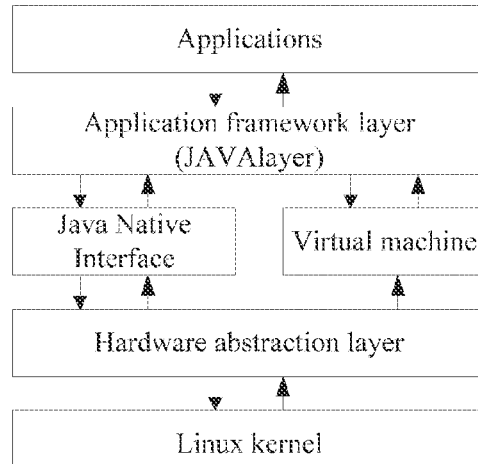
FIG. 2 is a diagram illustrating modules of an operating system.

FIG. 2 is a diagram illustrating modules of an operating system. As shown in FIG. 2, the operating system may include a LINUX kernel, a native framework, a JAVA environment (including a hardware abstraction layer), an application framework, and applications.

In various embodiments, the term "native" here may refer to software implemented by the programming language of the operating system kernel.

LINUX kernel generally includes a LINUX operating system and drivers which are generally implemented by the C language. Functions of the LINUX kernel mainly include security, memory management, process management, network protocols, driver models, and so on. The LINUX kernel may also serve as the abstract layer between hardware and the software stack. In various embodiments, besides a standard LINUX kernel, kernel driver programs are also provided in the operating system, e.g., Binder (IPC) drivers, display drivers, input device drivers, audio system drivers, camera drivers, WiFi drivers, Blue-tooth drivers, power supply management drivers, and the like.

The native framework and the JAVA environment (e.g., LIBRARIES and ANDROID RUNTIME of an ANDROID operating system) are generally implemented by C/C++ language. C/C++ libraries in the native framework layer can be used by different components of the operating system and provide services for developers through the application framework. The C/C++ libraries may include the following libraries. The library of the C system (libc) is a library of standard C functions inherited from BSD (Berkeley Standard Distribution), and is customized for embedded LINUX-based devices. A multimedia library is PackerVideo-based OpenCore. The multimedia library supports playback and recording of data in multiple commonly-used audio/video format, and supports encoding/decoding of data in multiple media formats. A surface manager is a manager of display sub systems and provides seamless merging of 2D and 3D image layers for various application programs. LibWebCore is a Web browser engine supporting browsers and embedded Web views. SGL is a Skia graphic library and is a 2D image engine at the bottom layer. 3D libraries are implemented based on OpenGL ES1.0 API and can use hardware 3D acceleration (if available) or highly optimized software 3D acceleration. FreeType is for displaying bitmaps and vector fonts. The JAVA environment (e.g., ANDROID RUNTIME) provides most functions of the Java kernel and is composed of Dalvik Java virtual machines and basic Java class libraries. Dalvik is a JAVA virtual machine used in the operating system. Each Android application runs in its own process and has an individual Dalvik virtual machine instance. Dalvik is designed to be a virtual system which can run multiple virtual machine instances at the same time with high efficiency. The virtual system executes Dalvik executable files having a suffix .dex. Files in the .dex format have done optimization to usage of small pieces of memory. Virtual machines are based on registers. All classes are compiled by a Java compiler, converted into the format .dex by "dx" tools in SDK (Software Development Kit), and then executed by a virtual machine. Dalvik virtual machines relies on some functions of the Linux kernel, e.g., the thread mechanism and bottom layer memory management mechanisms.

The ANDROID framework enables developers to freely visit the API framework used by core applications.

Applications in the operating system are all programmed using the JAVA language. Applications developed by users are in the same level with core applications in the operating system and are constructed based on the API provided by the operating system.

In the above structure of the operating system, a video capture system, also referred to as a camera system, is capable of inputting video data. The video capture system may be used by multiple applications, such as a camera application, a webcam application, a video call application, and the like. The camera system may include native codes and Java codes. The native codes refer to C/C++ language codes. An API (Application Program Interface) of the native codes is available to be called by two types of applications. In one type of application, the API provided by the native codes encapsulates JNI (Java Native Interface) of the camera system into a Java class, which may be called by applications, such as a camera application. In the other type of applications, the API may also be called when video input is needed by applications programmed using native codes.

In various embodiments, after video data is captured, the video capture system may call an API provided by the native codes to obtain a video data flow and send the video data flow directly to an encoder for encoding. The video data will not be processed by the Java framework and applications. The API provided by the native codes may be called by native codes of an application (e.g., the native codes may be C/C++ codes).

In various embodiments, the encoder may be re-encapsulated to make the video encoding API more suitable to be called by the native layer. As such, the capturing, encoding, and sending of the video data will not be processed by the Java layer, and system performances can also be improved.

The technical mechanism is applicable to the operating system as shown in FIG. 2 or other similar operating systems, e.g., ANDROID, SYMBIAN, WINDOWS PHONE, BLACKBERRY OS, MAC OSX, and so on.

Figure 3:
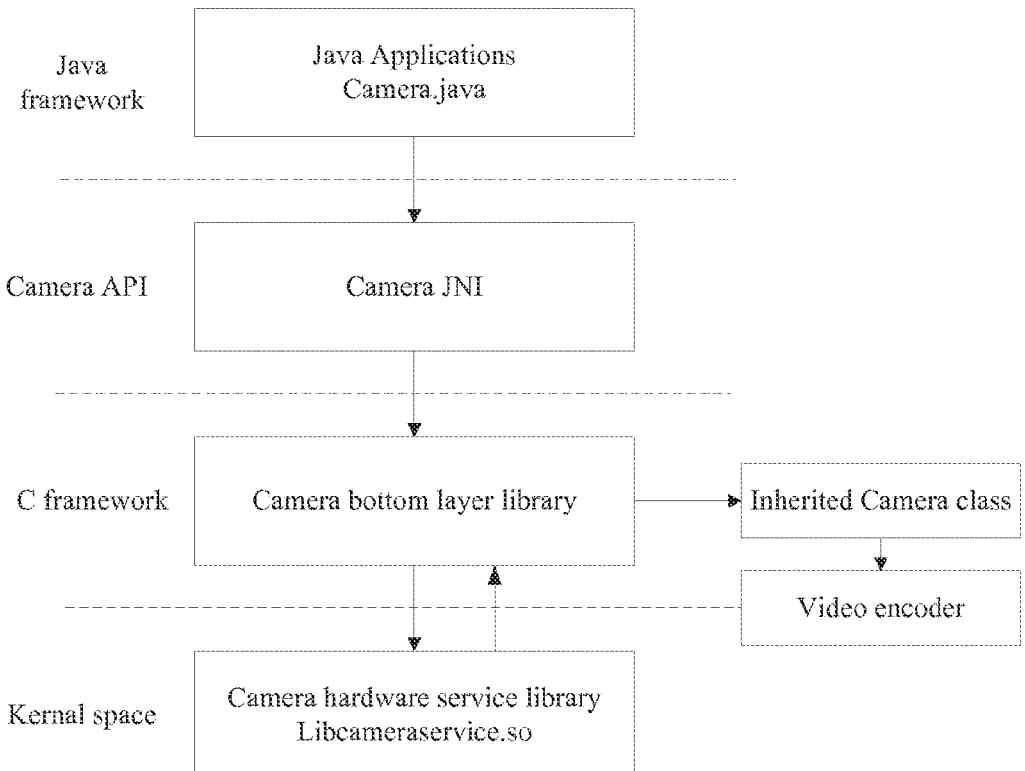
FIG. 3 is a diagram illustrating modules of a video capture system in accordance with various embodiments.

FIG. 3 is a diagram illustrating modules of a video capture system in accordance with various embodiments. As shown in FIG. 3, various embodiments capture and encode video data through inheriting the camera bottom layer library so as to avoid the need of calling by the Java native codes.

Figure 4:
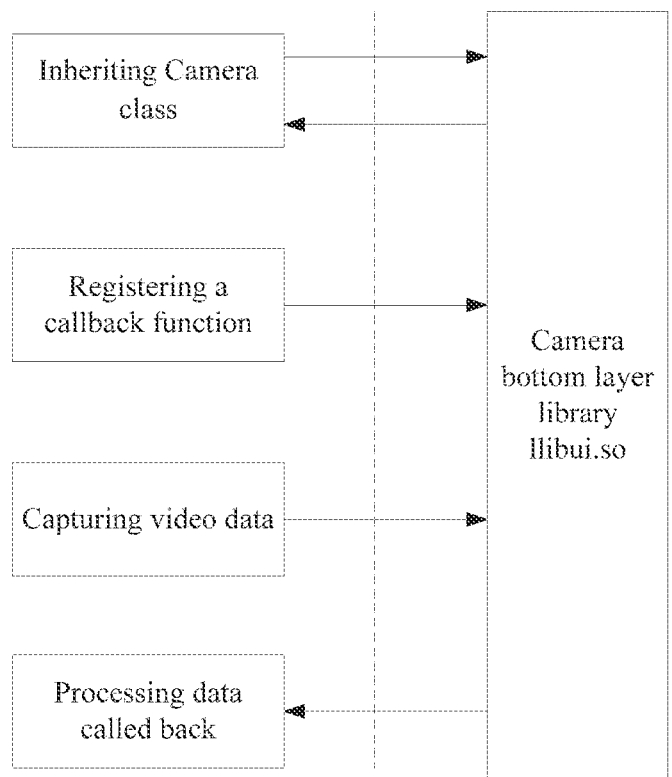
FIG. 4 is a diagram illustrating modules of a video capture system in accordance with various embodiments

FIG. 4 is a diagram illustrating modules of a video capture system in accordance with various embodiments. As shown in FIG. 4, a camera activation class is newly set up in a programming language framework layer (e.g., a C language framework layer) of the operating system to inherit a camera class in the camera bottom layer library (e.g., libui.co), and registers a callback function for the camera bottom layer. An application may call a capture start function interface of the camera activation class to start capturing data, call the callback function to obtain the data captured, and directly call an encoder to encode the data.

According to various embodiments, there is no need to transfer video data from the JAVA native framework layer to the Java application layer before the encoder is called to encode the video data. Thus, the process of copying and delivering the video data is simplified, and efficiency of capturing videos is also improved.

Figure 5:
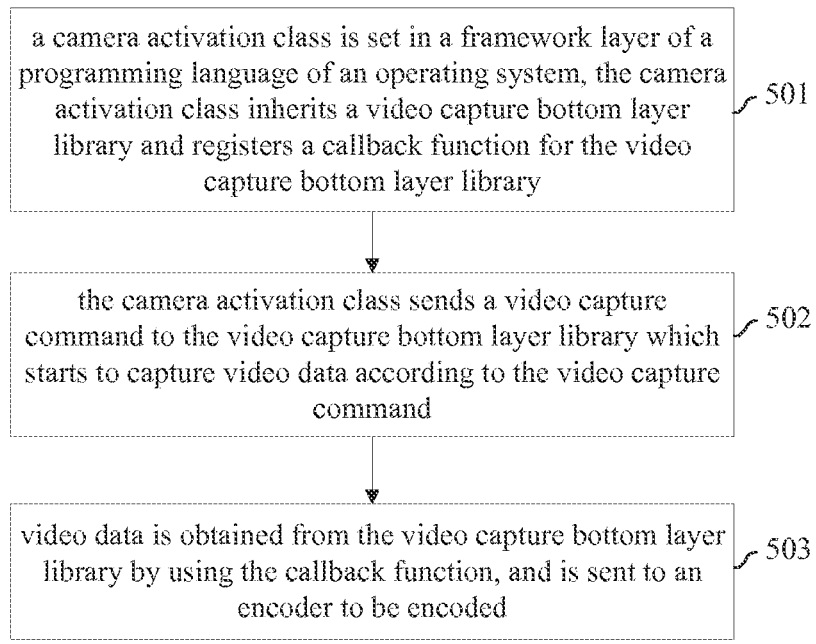
FIG. 5 is a flowchart illustrating a method for capturing videos in accordance with various embodiments.

FIG. 5 is a flowchart illustrating a method of capturing videos in accordance with various embodiments. As shown in FIG. 5, the method may include the following procedures.

At block 501, a video capture class (also referred to as camera activation class) is set in a framework layer of a programming language of an operating system. The video capture class inherits a class in a video capture bottom layer library and registers a callback function for the video capture bottom layer library.

The programming language framework layer may be a C language framework layer, a C++ language framework layer, or the like. The video capture bottom layer library (Libui.so) is the core of various libraries involved in video capture processes, e.g., Camera JAVA native calling library, Camera bottom layer library, Camera service library, hardware driver library, and the like. The video capture bottom layer library provides a camera class as the interface for the JNI layer. Camera.h is a header file defining external interfaces of the camera class. The camera class may implement basic functions of a camera, e.g., playback, stop, halt, and the like. Connect ( ) is a static function of the camera class for obtaining a camera instance. The camera class also provides a function for setting callback functions. Callback functions may be set by upper layer applications for use by the upper layer applications. A callback function set by the upper layer may be called by a function which set the callback function.

In various embodiments, a camera activation class may be set in a C language framework layer of an Android platform. The camera activation class may call a header file defining external interfaces of the camera class (e.g., Camera.h) in the video capture bottom layer library to inherit the video capture bottom layer library.

In various embodiments, a native function may be set by using a callback function interface of the header file defining external interfaces of the camera class (Camera.h) in the Libui.so. Then, the native function may be set to be the callback function for the camera class in the video capture bottom layer class.

At block 502, the video capture class sends a video capture command to the video capture bottom layer library which starts to capture video data according to the video capture command. The video capture bottom layer library may capture the video data by using a camera hardware service library, e.g., libcameraservice.so, in response to the video capture command.

At block 503, the video data is obtained from the video capture bottom layer library by using the callback function and sent to an encoder to encode the video data. In various embodiments, the video data may be obtained from the video capture bottom layer library by using the callback function and then sent to an encoder pre-set in a C language framework layer of an Android platform to be encoded. In various embodiments, the method may also include a Java framework layer application, which sends a video capture command to a camera API layer, which forwards the video capture command to the camera activation class in the C language framework layer. In various embodiments, the method may also include providing video data codes obtained by the encoder for an application for processing. The application may package and send the video data codes to a communication peer in a network or may store the video data codes in a storage device.

The technical mechanism may be applied to various versions of Android platforms. For example, the technical mechanism is applicable to ANDROID Beta, ANDROID 1.0, ANDROID 1.5, ANDROID 1.6, ANDROID 2.0/2.1, ANDROID 2.2, ANDROID 2.3, ANDROID 3.0, ANDROID 4.0, ANDROID 4.1, and so on.

The above only lists versions of Android platforms as an example of the application scenario of the technical mechanism of the examples. However, the technical mechanism is also applicable to any version of Android-based platforms and other similar operating systems.

Figure 6:
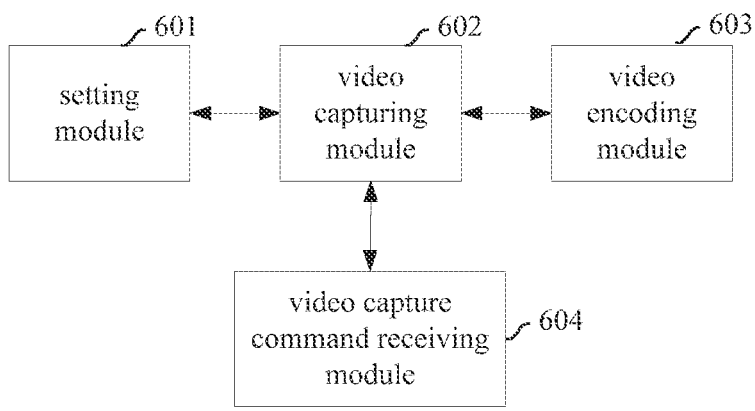
FIG. 6 is a diagram illustrating modules of a video capture apparatus in accordance with various embodiments. Corresponding reference numerals indicate corresponding parts throughout the several views of the drawings.

FIG. 6 is a diagram illustrating modules of a video capture apparatus in accordance with various embodiments. As shown in FIG. 6, the apparatus may include a setting module 601, a video capturing module 602, and a video encoding module 603. The setting module 601 is configured to set a video capture class in a programming language framework layer of an operating system (e.g., a C language framework layer). The video capture class inherits a class in a video capture bottom layer library and registers a callback function for the video capture bottom layer library.

The video capturing module 602 is configured to enable the video capture class to send a video capture command to the video capture bottom layer library, which starts to capture video data according to the video capture command.

The video encoding module 603 is configured to obtain the video data from the video capture bottom layer library by using the callback function and send the video data to an encoder to encode the video data.

In various embodiments, the setting module 601 may set a camera activation class in a C language framework layer of an Android platform. The camera activation class may call a header file defining external interfaces of a camera class in the video capture bottom layer library (e.g., Camera.h) to inherit the video capture bottom layer library.

In various embodiments, the setting module 601 may set a native function by using a callback function interface of the header file defining external interfaces of the camera class in the video capture bottom layer library and set the native function to be the callback function for the camera class in the video capture bottom layer library.

In various embodiments, the video capturing module 602 may make the camera activation class send a video capture command to the video capture bottom layer library and the header file defining external interfaces of the camera class in the video capture bottom layer library calls a video capture start function to capture video data.

In various embodiments, the video encoding module 603 may obtain the video data from the video capture bottom layer library by using the callback function and send the video data to the encoder pre-set in a C language framework layer of an Android platform to encode the video data.

In various embodiments, the video capturing module 602 is configured to trigger the camera activation class to send a video capture command to the video capture bottom layer library, which triggers a camera hardware service library, e.g., libcameraservice.so, to capture video data according to the video capture command.

In various embodiments, the apparatus may also include a video capture command receiving module 604.

The video capture command receiving module 604 is configured to trigger an application in a Java application layer to send the video capture command to a camera API layer. The camera API layer sends the video capture command to the camera activation class in the C language framework layer.

The technical mechanism of the various embodiments is applicable to various terminal devices. The terminal devices may include, but are not limited to, feature phones, smart phones, PCs, tablet computers, personal digital assistants (PDA), and the like.

The above description takes the Android system as an example. The technical mechanism is also applicable to other operating systems. The operating systems may include, but are not limited to, Android, iOS, Symbian, Windows Phone, BlackBerry OS, Mac OSX, and the like.

When applied to operating systems other than Android, the technical mechanism may be adjusted to adapt to requirements and application environment of the operating systems, e.g., adjusting the name of the modules, the order of the steps being executed, and the like. However, the modifications are still within the scope of the present disclosure.

Various forms may be adopted to implement the video capture method and/or apparatus. The apparatus may be programmed into a plug-in that can be installed in a mobile terminal based on certain application interface standards, or may be encapsulated into an application which can be downloaded and used by users. When the apparatus is programmed to be a plug-in, the format of the plug-in may be ocx, dll, cab, or the like. The apparatus may also be implemented by a Flash plug-in, a RealPlayer plug-in, an MMS plug-in, a MIDI plug-in, an ActiveX plug-in, or the like.

A machine-readable storage medium is also provided, which is to store instructions executable by a machine to implement the method of various embodiments. Specifically, a system or apparatus may have a storage medium which stores machine-readable program codes for implementing functions of any of the above examples. A computing device (or a CPU or an MPU) in the system or the apparatus may read and execute the program codes stored in the storage medium. In addition, the program codes may cause an operating system running in a computer to implement part or all of the operations. In addition, the program codes may be read out from a storage medium and may be written in a storage device in an extension board inserted in the computer or in a storage device in an extension unit connected to the computer. In this example, a CPU in the extension board or the extension unit executes at least part of the operations according to the instructions of the program codes to realize the technical mechanism of any of the above examples.

The video capture method and/or apparatus may be stored in various types of storage medium in the form of instructions or an instruction set. The storage medium may include, but is not limited to, floppy disk, compact disk, DVD, hard drive, flash memory, USB flash disk, CF card, SD card, MMC card, SM card, memory stick, xD card, and the like. The method and/or apparatus may also be implemented by Nand flash-based storage medium, such as USB flash disk, CF card, SD card, MMC card, SM card, memory stick, xD card, and the like.

According to the above technical mechanism, a camera activation class is set in a framework layer of a programming language, inherits a video capture bottom layer library, and registers a callback function for the video capture bottom layer library. The camera activation class sends a video capture command to the video capture bottom layer library, which captures video data according to the video capture command. The camera activation class obtains the video data from the video capture bottom layer library by using the callback function, and sends the video data to an encoder to encode the video data. According to various embodiments, the capturing, encoding, and sending of video data are all implemented in the framework layer of a programming language, and do not need processing at Java-implemented layer. Therefore, time needed for copying and delivering the video data can be reduced, and the efficiency of capture video data can be increased.

It should be understood that in the above processes and structures, not all of the procedures and modules are necessary. Certain procedures or modules may be omitted according to the needs. The order of the procedures is not fixed and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various embodiments, a module may be implemented by hardware and/or machine-executable instructions. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The scope of the claims should not be limited by the various embodiments, but should be given the broadest interpretation consistent with the description as a whole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for capturing videos, comprising:
    setting a video capture class in a framework layer of a first programming language, the video capture class inheriting a class in a video capture bottom layer library and registering a callback function for the video capture bottom layer library;
    receiving, by the video capture class, a video capture command sent by an application in an application layer of a second programming language other than the first programming language;
    sending, by the video capture class, the video capture command to the video capture bottom layer library which starts to capture video data according to the video capture command;
    obtaining, by the video capture class, the video data from the video capture bottom layer library by using the callback function;
    sending, by the video capture class, the video data to an encoder which is pre-set in the framework layer of the first programming language and instructing the encoder to encode the video data; and
    providing, by video capture class, video data codes obtained by the encoder to the application in the application layer.

2. The method of claim 1, wherein the setting the video capture class in the framework layer of the first programming language, the video capture class inheriting a class in the video capture bottom layer library comprises:
    setting the video capture class in the framework layer of the first programming language, the video capture class being capable of calling a header file defining external interfaces in a camera class in the video capture bottom layer library.

3. The method of claim 1, wherein registering a callback function for the video capture bottom layer library comprises:
    setting a first function by using a callback function interface of a header file defining external interfaces of a camera class in the video capture bottom layer library; and
    setting the first function as the callback function for the camera class in the video capture bottom layer library.

4. The method of claim 1, wherein the sending by the video capture class a video capture command to the video capture bottom layer library which starts to capture video data according to the video capture command comprises:
    sending, by the video capture class, the video capture command to the video capture bottom layer library; and
    triggering, by the video capture bottom layer library, a header file defining external interfaces of a camera class in the video capture bottom layer library to call a video capture start function to capture the video data.

5. The method of claim 1, wherein the first programming language is C or C++, the second programming language is Java.

6. The method of claim 1, wherein the video capture bottom layer library starts to capturing video data according to the video capture command comprises:
    capturing, by the video capturing bottom layer library, the video data by using a camera hardware service library in response to the video capture command.

7. The method of claim 1, wherein the video capture bottom layer library is compiled into a library.

8. The method of claim 1, further comprising:
    sending, by the application in the application layer of the second programming language, the video capture command to a camera API layer; and
    sending, by the camera API layer, the video capture command to the video capture class in the framework layer of the first programming language.

9. An apparatus for capturing videos, comprising a processor and a memory, the memory storing instructions for a framework layer of a first programming language, instructions for an application layer of a second programming language other than the first programming language, instructions for an application in the application layer, and instructions for a setting module:
    the instructions for the setting module are executable by the processor to set a video capture class in the framework layer, the video capture class inherits a class in a video capture bottom layer library and registers a callback function for the video capture bottom layer library;
    the video capture class is configured to receive a video capture command sent by the application in the application layer, send the video capture command to the video capture bottom layer library which starts to capture video data according to the video capture command,
    obtain the video data from the video capture bottom layer library by using the callback function, send the video data to an encoder which is pre-set in the framework layer of the first programming language and instruct the encoder to encode the video data, and provide video data codes obtained by the encoder to the application in the application layer.

10. The apparatus of claim 9, wherein
    the video capture class inherits a class in the video capture bottom layer library by calling a header file defining external interfaces of a camera class in the video capture bottom layer library.

11. The apparatus of claim 9, wherein
the instructions for the setting module are executable by the processor to set a native function by using a callback function interface of a header file defining external interfaces of a camera class in the video capture bottom layer library, and set the native function as the callback function for the camera class in the video capture bottom layer library.

12. The apparatus of claim 9, wherein
the video capture class is configured to send a video capture command to the video capture bottom layer library, a header file defining external interfaces of a camera class in the video capture bottom layer library calling a video capture start function to start capturing the video data.

13. The apparatus of claim 9, wherein the first programming language is C or C++, the second programming language is Java.

14. The apparatus of claim 9, wherein
the video capture class is configured to send the video capture command to the video capture bottom layer library which uses a camera hardware service library to capture the video data.

15. The apparatus of claim 9, wherein the video capture bottom layer library is compiled into a library.

16. The apparatus of claim 9, wherein
the instructions for the application are executable by the processor to send the video capture command to a camera API layer which sends the video capture command to the video capture class in the framework layer of the programming language.

\* \* \* \* \*